United States Patent [19]

Morgan et al.

[11] 3,795,823

[45] Mar. 5, 1974

[54] SIGNAL DETECTION IN NOISY TRANSMISSION PATH

[75] Inventors: David Keith Morgan, Flemington; Robert Charles Heuner, Bound Brook, both of N.J.

[73] Assignee: RCA Corporation, Princeton, N.J.

[22] Filed: Nov. 9, 1972

[21] Appl. No.: 304,892

[52] U.S. Cl. .................... 307/247, 307/215, 328/63
[51] Int. Cl. .................... H03k 17/56
[58] Field of Search ...... 307/215, 218, 247; 328/58, 328/94, 63

[56] References Cited

UNITED STATES PATENTS

| | | | |
|---|---|---|---|
| 3,244,986 | 4/1966 | Rumble | 307/218 |
| 3,284,715 | 11/1966 | Kaminsky | 328/94 |
| 3,564,429 | 2/1971 | Miller | 328/58 |
| 3,440,546 | 4/1969 | Nelson | 328/58 |
| 3,430,148 | 2/1969 | Miki | 307/215 |
| 3,327,225 | 6/1967 | Schell | 307/215 |
| 3,264,567 | 8/1966 | Prieto | 307/215 |
| 3,287,495 | 11/1966 | Willard | 307/218 |

*Primary Examiner*—Rudolph V. Rolinec
*Assistant Examiner*—R. E. Hart
*Attorney, Agent, or Firm*—H. Christoffersen; Samuel Cohen

[57] ABSTRACT

Circuit for sensing the presence of a signal on a line preceded by noise on the line, such as noise created by switch bounce. The circuit, which includes flip-flops and logic gates, ignores noise bursts and produces only a single change in direct voltage level at the circuit output terminal, in response to a signal.

11 Claims, 2 Drawing Figures

SIGNAL DETECTION IN NOISY TRANSMISSION PATH

BACKGROUND OF THE INVENTION

The situation in which both signal and noise may be present on a line is common in many electrical systems. An example of particular interest in the present application is a digital circuit, such as an electronic watch, in which the momentary closing of a mechanical switch is employed to set the time. At the instant the switch is closed, the "bounce" of the switch contacts results in electrical oscillations on the line and it is not until these die down that a steady direct voltage level remains. These oscillations or other noise must be kept from the digital circuit to prevent undesired eratic operation thereof. In the case of the electronic watch, for example, where a mechanical switch is employed to set the time, the oscillations would cause the time to advance at an erratic rate corresponding to the switch bounce frequency. Notwithstanding this, the circuit should receive, within a reasonable time after the switch has been closed, some positive indication that this event has occurred.

SUMMARY OF THE INVENTION

Means responsive to a control signal and to noise on a line preceding an information signal on that line for producing and storing a first signal and means responsive to the stored first signal, the presence of an information signal on the line, and a second control signal following the first-mentioned control signal, for producing and storing a second signal, indicative of an information signal on the line.

DETAILED DESCRIPTION

Figure 1:
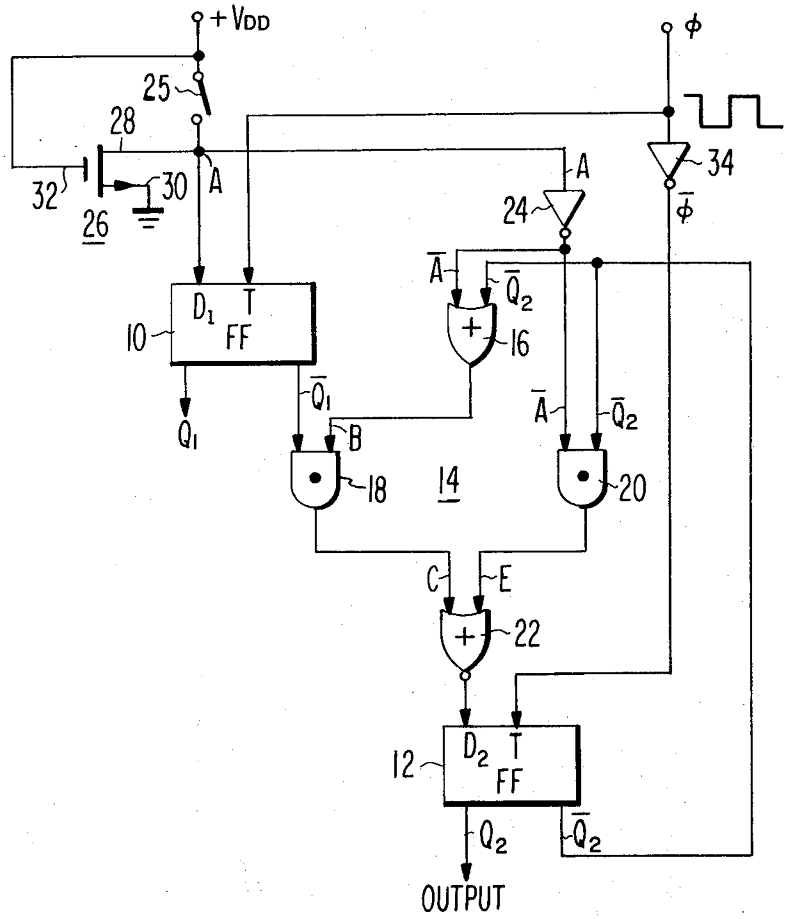
FIG. 1 is a logic diagram of a preferred embodiment of the invention.

The circuit of FIG. 1 includes two triggerable flip-flops 10 and 12 and a logic circuit indicated generally by the number 14. The state the triggerable flip-flop assumes is controlled by the information signal present at its data terminal ($D_1$ in the case of 10 and $D_2$ in the case of 12) when a positive-going edge of the clock signal occurs. If, at this time, the signal applied to the D terminal is relatively high, the flip-flop becomes set and if it is relatively low, the flip-flop becomes reset. For purposes of the present discussion, a relatively high signal, such as $V_{DD} = +6$ volts, represents binary 1 and a relatively low signal, such as ground, represents binary 0 (other suitable voltages may, of course, be used instead).

The logic circuit includes an OR gate 16, two AND gates 18 and 20, and a NOR gate 22. OR gate 16 receives the complementary signal $\overline{A}$ produced by inverter 24 and $\overline{Q}_2$ signal produced by flip-flop 12. AND gate 18 receives the $\overline{Q}_1$ signal produced by flip-flop 10 and the B signal produced by OR gate 16. AND gate 20 receives the signals $\overline{A}$ and $\overline{Q}_2$. NOR gate 22 receives the signal C produced by AND gate 18 and the signal E produced by AND gate 20. NOR gate 22 connects to the data terminal $D_2$ of flip-flop 12.

The single-pole, single-throw switch, which at the instant of closure produces noise due to contact bounce, is shown at 25. It connects to the data terminal $D_1$ of flip-flop 10. An N-type MOS transistor 26 is connected at its drain electrode 28 to the data terminal $D_1$ and at its source electrode 30 to a reference voltage source such as ground. The gate electrode 32 of this transistor connects to the voltage source $+V_{DD}$. As connected, the transistor operates as a load resistor, as discussed briefly below.

As already mentioned, the clock signal $\phi$ is applied to the triggerable flip-flop 10. Inverter 34 applies the complement $\overline{\phi}$ of this clock signal to the trigger terminal of flip-flop 12.

Figure 2:
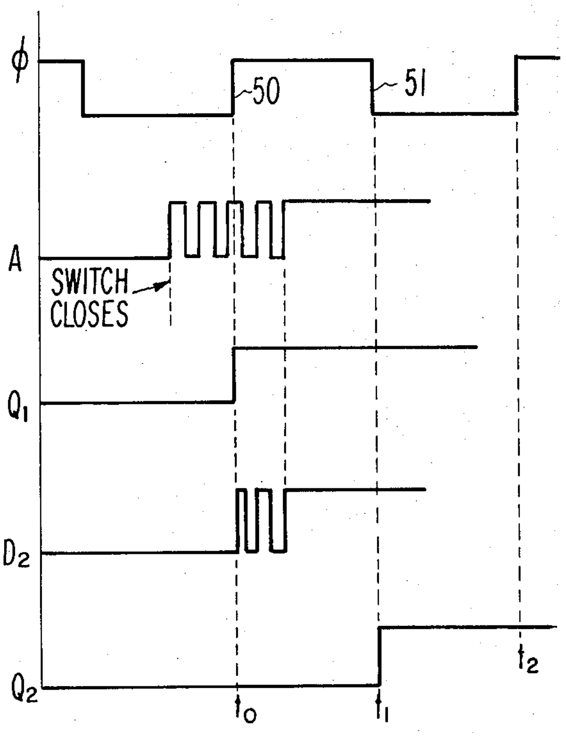
FIG. 2 is a drawing of waveforms present in the circuit of FIG. 1.

In the discussion of the operation of the circuit of FIG. 1 which follows, both FIGS. 1 and 2 should be referred to. The field-effect transistor 26 is normally biased on by the positive voltage applied to its gate electrode. Accordingly, a conduction path exists between the drain 28 and source 30 electrodes. The design of this transistor is such that the conduction path impedance is relatively high. Nevertheless, it does function to effectively clamp the $D_1$ terminal of flip-flop 10 to ground potential when switch 25 is open. Thus, flip-flop 10 normally is in its reset condition ($\overline{Q}_1 = 1$) and it may be assumed for the present that flip-flop 12 is also normally in its reset condition ($\overline{Q}_2 = 1$).

When switch 25 is thrown to the closed position, mechanical oscillations occur at the switch due to "contact bounce." Transistor 26 continues to operate as a load resistor. Each interval during such oscillations that the switch arm is in actual contact with the switch terminal, the voltage at A is pulled up to $V_{DD}$; each interval that the switch 26 is open, the voltage at A is pulled back down to ground through transistor 26. The positive swings of the voltage are sufficient, if present at $D_1$ when the positive-going leading edge of the clock signal occurs, to set flip-flop 10.

Assume now that at time $t_0$ (FIG. 2) during one of the positive excursions of A, the leading edge 50 of clock signal $\phi$ occurs. This causes the flip-flop 10 to become set so that $\overline{Q}_1$ changes to 0. This disables AND gate 18, changing C to 0. The positive-going edge 50 of the wave $\phi$ has no effect on flip-flop 12 because inverter 34 inverts this signal so that it appears as a negative-going edge to the flip-flop 12.

A signal at A is inverted at 24 and the complementary signal $\overline{A}$ serves as one input to AND gate 20. The second signal applied to AND gate 20 is the signal $\overline{Q}_2$ which, at time $t_0$ is equal to 1. This signal therefore serves as a priming signal to AND gate 20. Now, each time the signal A goes relatively negative, representing a 0, $\overline{A}$ goes positive, representing a 1 and AND gate 20 becomes enabled and each time the signal A goes positive, $\overline{A}$ represents a 0 and AND gate 20 becomes disabled. The signal E thereby produced is an oscillation which is complementary to the oscillation A. As C=0, each time $E$ represents a 0, a 1 is applied to the $D_2$ terminal and each time the signal E represents a 1, a O is applied to the $D_2$ terminal. This oscillating signal is shown at $D_2$ in FIG. 2. During the period between $t_0$ and the time just before $t_1$, this oscillating signal, if present, has no effect on the second flip-flop 12 in view of the absence of the positive-going edge of the clock signal $\phi$.

At time $t_1$, which is one-half period of the clock signal $\phi$ later than the time the first flip-flop 10 was set, it may be assumed that oscillations due to switch bounce have died down. Immediately before $t_1$, $\overline{Q}_2$ was still 1. After switch bounce has died down, $A = 1$ so that $\overline{A} = 0$. Thus, AND gate 20 is disabled. As previously mentioned, $\overline{Q}_1 = 0$ (flip-flop 10 is set) so that AND gate 18 also is disabled. Thus, $C = E = 0$, enabling NOR gate 22 so that $D_2 = 1$. At time $t_1$, $\phi$ goes negative so that $\overline{\phi}$ goes positive. This positive-going signal triggers flip-flop 12 and the latter becomes set. The output signal $Q_2 = 1$ serves as the input to the circuit it is desired to actuate. One application for this circuit is in the time-setting control for an integrated circuit watch. However, this is just one example of the use of the circuit.

When flip-flop 12 becomes set, $\overline{Q}_2$ changes to 0. This signal maintains AND gate 20 disabled so that $E=0$. As flip-flop 10 also is set, $\overline{Q}_1 = 0$ and AND gate 18 is disabled. Thus $C=0$. Accordingly, NOR gate 22 is locked in the enabled state; $D_2$ remains 1 and the clock signal $\overline{\phi}$ does not distrub the set state of flip-flop 12. This condition remains so long as switch 25 stays closed.

In the explanation above of the operation of the circuit, the assumption was made that at time $t_0$ a positive-going peak of the oscillation was present at $A$. This need not be the case. If, instead, a negative-going oscillation is present, then the positive going edge 50 of the clock signal $\phi$ will cause the first flip-flop 10 to remain in the reset condition. If flip-flop 10 remains reset, the second flip-flop 12 never can become set. With flip-flop 10 reset, $\overline{Q}_1 = 1$, priming AND gate 18. $\overline{Q}_2$ also is 1, enabling OR gate 16. Thus, $B = 1$ so that AND gate 18 is enabled and C remains 1. If $C$ remains 1, $D_2$ remains 0 and flip-flop 12 remains reset.

Under the circumstances above, the flip-flop 10 will not become set until time $t_2$ which is one complete period of the clock signal after time $t_0$, assuming that between times $t_0$ and $t_2$, the oscillations due to switch bounce have ceased. In the present application, the delay which results is no particular disadvantage. For example, if the frequency of $\phi$ is 30 Hz, the delay of 1 period is only 1/30 of a second.

In the foregoing explanation, it was also assumed that at time $t_1$, the oscillations had died down. If not, the circuit still can operate. If at time $t_1$, flip-flop 10 already is set but A is relatively negative due to a negative-going swing in the oscillations which still may be present, $\overline{A} = 1$. $\overline{Q}_2 = 1$ so that $E = 1$. Therefore, $D_2 = 0$ and flip-flop 12 does not become set at time $t_1$. But, one complete period of the clock signal later, the oscillations surely should have died out and at that time, flip-flop 12 will become set.

However, if flip-flop 10 is set at time $t_0$ and at time $t_1$ oscillations are still present and $A$ is 1, then flip-flop 12 will become set. This means that the oscillations have been interpreted as a data signal and this may not be a valid assumption. For this reason, it is preferred that the frequency of the clock signal be chosen so that in one half-period of the clock after flip-flop 10 has been set, the oscillations have died down.

It may also sometimes occur in other applications of this circuit mentioned later, that the flip-flop 10 is set by noise not followed by any signal. That is, after a short burst of noise present at node A during which the clock signal $\phi$ sets flip-flop 10, A returns to 0. In this case, assuming the burst has died out within a half period of the clock signal, flip-flop 12 does not become set. One period of the clock signal after flip-flop 10 is set, the clock signal resets flip-flop 10. Thus, this noise burst produces no output signal at $Q_2$.

When the switch 25 is opened, both flip-flops 10 and 12 shortly become reset. The operation should be clear from what has already been discussed. In brief, $A$ changes to 0 and when the positive-going leading edge, such as 50, of the clock signal $\phi$ occurs, flip-flop 10 becomes reset. This primes AND gate 18. The signal $\overline{A} = 1$ enables OR gate 16 so that $B = 1$. Thus, AND gate 18 places a 1 at $C$ of NOR gate 22 so that $D_2$ equals 0. Now, when a negative-going edge such as 51 of wave $\phi$ occurs, $\overline{\phi}$ goes positive and flip-flop 12 is reset.

In a number of applications of the present invention, it is important to be able to use a single-pole, single-throw switch such as 25. Such a switch is of simple mechanical design and can be made of sufficiently small size to fit the space available in a small case such as might be used for an electronic wrist watch. Were it permitted to use, for example, a single pole, double-throw switch, other simpler logic designs are possible.

It should be mentioned that while the present circuit is illustrated as one especially suitable for eliminating the harmful effect of switch bounce, it is also useful in other applications. For example, in automobile clock applications, especially those employing relatively long lines for carrying a time setting signal from a switch which is not physically close to the time setting input of the clock, noise often is a problem. The line may pass through environments in which there is high ambient noise due to switching of high voltages, for example, and the fields due to these voltages induce noise signals on the lines. In these applications, just as in the one described, it is necessary to have some means available for providing a positive indication of the presence of signal while discriminating against noise. This means is the same circuit shown in FIG. 1.

The circuit is also useful in certain automatic test systems where no switch such as 25 is present. Instead, node A may be tied to a long line which passes through a high electrical noise environment and in which it is necessary to distinguish a change in the direct voltage level (signal) on the line from noise alternating voltage fluctuations on the line.

It is mentioned above that the clock signal $\phi$ may be a 30 Hz square wave. This, of course, is intended as an example only. If the oscillations exist for a relatively longer interval than contemplated here, the frequency may be reduced to say 15 Hz or even lower frequency and, alternatively, if they exist for a shorter duration, then the frequency may be increased.

What is claimed is:

1. In combination:

first and second flip-flops, each having a data input terminal, a trigger terminal and an output terminal;

a logic circuit including first gate means normally primed by said first flip-flop, second gate means normally primed by said second flip-flop and third gate means driven by said first and second gate means and coupled at its output terminal to the data terminal of the second flip-flop, said third gate means being enabled only when both the first and second gate means are disabled;

an input line for carrying a direct current level signal it is desired to detect and for sometimes also carrying noise, coupled to the data terminal of said first flip-flop and also to said first and second gate means, the latter in a sense to disable both gate means when signal is present and to enable both gate means when signal is not present; and means for applying a clock signal to the trigger terminal of said first flip-flop and its complement to the trigger terminal of said second flip-flop.

2. In the combination as set forth in claim 1, said first and second gate means each comprising an AND gate and said third gate means comprising a NOR gate.

3. In the combination as set forth in claim 2, further including inverter means, said input line being coupled to said first and second gate means via said inverter means.

4. A circuit for sensing the presence of a direct current level signal on an input line preceded by noise on said line comprising, in combination:

first gate means;

means responsive to the noise on said line preceding said signal for disabling said first gate means;

second gate means;

means responsive to the signal on said line following said noise for disabling said second gate means; and means responsive to a control signal produced a given interval of time after said first gate means is disabled, said interval being chosen normally to be sufficient to permit the noise to dissipate and the signal, if present, to appear, and to the disabled condition of both said first and said second gate means, for indicating that a signal is present on said line.

5. A circuit as set forth in claim 4, further including means responsive to the absence of signal after said given time interval and to a second control signal, for enabling said first gate means.

6. A circuit as set forth in claim 5, wherein said two control signals are complementary signals.

7. A circuit as set forth in claim 4, wherein said means responsive to noise on said line comprises a first flip-flop.

8. A circuit as set forth in claim 7, said means responsive to a control signal including a second flip-flop.

9. A circuit as set forth in claim 7, said means responsive to said disabled condition of said first and second gate means comprising a NOR gate.

10. A circuit for sensing the presence of a direct current level information signal on an input line preceded by noise on said line comprising, in combination:

means responsive to a first control signal and to the noise on said line preceding said information signal for producing and storing a first signal; and means responsive to the stored first signal, to the presence of the information signal on said line following said noise and to a second control signal following the first control signal by an interval $\Delta t$, for producing and storing a second signal, this one indicative of said information signal on said line, where $\Delta t$ is an interval which is normally sufficient to permit the noise to dissipate and the signal, if present, to appear.

11. A circuit as set forth in claim 10, further including means responsive to the recurrence of said first control signal during a time interval after said second control signal has terminated, and to the absence of signal on said line, for removing said first signal.

* * * * *